United States Patent
Dirschlmayr et al.

(10) Patent No.: US 10,317,201 B2
(45) Date of Patent: Jun. 11, 2019

(54) SAFETY MONITORING FOR A SERIAL KINEMATIC SYSTEM

(71) Applicant: B&R INDUSTRIAL AUTOMATION GMBH, Eggelsberg (AT)

(72) Inventors: Thomas Dirschlmayr, Salzburg (AT); Thomas Kapeller, Hallwang (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 525 days.

(21) Appl. No.: 14/782,522

(22) PCT Filed: Mar. 17, 2014

(86) PCT No.: PCT/EP2014/055243
§ 371 (c)(1),
(2) Date: Oct. 5, 2015

(87) PCT Pub. No.: WO2014/187590
PCT Pub. Date: Nov. 27, 2014

(65) Prior Publication Data
US 2016/0047647 A1  Feb. 18, 2016

(30) Foreign Application Priority Data
May 22, 2013  (AT) ................................ A50348/2013

(51) Int. Cl.
*B25J 9/16* (2006.01)
*G01B 21/00* (2006.01)

(52) U.S. Cl.
CPC ............ *G01B 21/00* (2013.01); *B25J 9/1674* (2013.01); *G05B 2219/43203* (2013.01); *G05B 2219/49137* (2013.01)

(58) Field of Classification Search
CPC ................................ G01B 21/00; B25J 9/1674
(Continued)

(56) References Cited

U.S. PATENT DOCUMENTS 4,718,078 A  1/1988 Bleidorn et al.
6,778,867 B1 *  8/2004 Ziegler .................. B25J 9/1674
                                                318/563
(Continued)

FOREIGN PATENT DOCUMENTS

DE       102 51 584      5/2004
DE   10 2005 061 618     6/2007
(Continued)

OTHER PUBLICATIONS

Translation of International Preliminary Examination Report (PCT/IPEA/409).
(Continued)

*Primary Examiner* — Eman A Alkafawi
(74) *Attorney, Agent, or Firm* — Greenblum & Bernstein, P.L.C.

(57) ABSTRACT

The invention relates to a method for monitoring the safety of a joint (12) of a serial kinematic structure (30), which carries out tasks within a work region (100) under the control of a control unit (20), wherein a current state variable of the joint (12), such as the absolute position (AP) or the time derivatives thereof, is determined cyclically during operation from the current axis position (P) of the joint (12) and compared to a configurable limit value (SA, TA, SL), wherein a function module (3, 4, 5) is used to monitor the state variable. A function module (3, 4, 5) is assigned to each state variable to be monitored. These function modules (3, 4, 5) are designed independently of the control unit (20) of the serial kinematic structure (30), whereby the safety monitoring system (10) can be operated concurrently with and independently of the control unit (20) of the serial kinematic structure (30).

16 Claims, 4 Drawing Sheets

(58) Field of Classification Search
USPC .......................................................... 702/150
See application file for complete search history.

(56) References Cited

U.S. PATENT DOCUMENTS

| | | | |
|---|---|---|---|
| 7,567,272 | B2 | 7/2009 | Lohmann |
| 8,090,474 | B2 | 1/2012 | Fiebiger |
| 2004/0125206 | A1 | 7/2004 | Lohman |
| 2008/0065098 | A1* | 3/2008 | Larkin ............... A61B 1/00087 606/130 |
| 2009/0076654 | A1 | 3/2009 | Kock |
| 2012/0290131 | A1* | 11/2012 | Khoukhi ............... B25J 9/1623 700/250 |

FOREIGN PATENT DOCUMENTS

| | | |
|---|---|---|
| DE | 102006000635 | 8/2007 |
| DE | 10 2007 037 078 | 2/2009 |
| DE | 10 2008 021 671 | 11/2009 |
| JP | 60-195602 | 4/1985 |
| WO | 99/29474 | 6/1999 |

OTHER PUBLICATIONS

Communication of Notice of Opposition mailed from EPO in counterpart Europe Appln. 14711730.3 (dated Apr. 9, 2018).

Sinumerik Safety Integrated Funktionshandbuch (Mar. 2006).

KUKA.SafeOperation 3.1, Montage- und Betriebsanleitung, Stand (Apr. 26, 2012).

DIN EN 61508-1 VDE 0803-1 Funktionale Sicherheit . . . Elektronischer Systeme—Teil 1: Allgemeine Anforderungen (Feb. 2011).

IEC 62061 Edition 1.0, Safety of Machinery-Funtional . . . control systems (Jan. 2005).

DIN EN ISO 10218-1 Industrieroboter-Sicherheitsanforderungen—Teil 1: Roboter (Jan. 2010).

* cited by examiner

SAFETY MONITORING FOR A SERIAL KINEMATIC SYSTEM

The invention relates to a method for safety monitoring and to a safety monitoring system for a joint of a serial kinematic structure, which carries out tasks under the control of a control unit, wherein for safety monitoring a current state variable of the joint, such as the absolute position or the time derivatives thereof, is ascertained cyclically from the current axis position of the joint and compared to a configurable limit value, wherein a function module is used to monitor the state variable.

Manipulators, actuators and automata comprising multiple axes, such as serial kinematic structures, which all-encompassingly are also referred to as robots, repeatedly pose hazard potential for operating staff. The resulting risks can often be reduced by design measures, wherein residual risk remains in any case. For this reason, safety-relevant characteristics are generally evaluated, and the serial kinematic structure is stopped or approved for motion. In serial kinematic structures, monitoring is usually carried out by comparing state variables, wherein the actual values of the state variables are compared to predefined set-point values in the control unit of the serial kinematic structures. These state variables may include an angle, for example, which determines the orientation of the tool in a working plane, or else Cartesian coordinates, which describe the location of a reference point. In the majority of cases, monitoring with respect to the tolerance range is also carried out, within which the serial kinematic structure can operate without physically colliding with personnel or technical installations. This is often achieved by preventing physical access, which is to say by arranging the serial kinematic structure within a closed machining cell. In contrast, optical monitoring devices for monitoring a permissible work space of the serial kinematic structure are also becoming increasingly established due to the rising interaction between man and machine.

In connection with the monitoring of a serial kinematic structure, DE 10 2007 037 078 A1 shows a method for adhering to work space boundaries during the movement of the serial kinematic structure within a defined work space or a defined boundary zone. Pose- and position-dependent or situation-dependent stopping points/shut-off points may be implemented for this purpose. The stopping movement is determined in advance as a function of certain physical quantities, such as the mass of the work equipment, and stored in a memory of the kinematics control unit in the form of a multidimensional table. During operation, the control unit can access these values and infer a brake path from the table as a function of the measured current variables, whereby an impending violation of the boundary zone is recognized and timely shutdown of the serial kinematic structure is implemented. It goes without saying that this requires comprehensive and time-consuming preparation with respect to the creation of the necessary table, which must capture all possible stopping movements. This table integrated in the control unit of the serial kinematic structure is, of course, only valid for a certain design of kinematics. For example, if the kinematic structure were to be supplemented with a joint, this would result in a wealth of new stopping movements, which would have to be included accordingly in the table in an anticipatory manner, which is correspondingly complex.

Another protective device for monitoring the work space of serial kinematic structure, which is known in different variant embodiments, is optical monitoring by way of cameras. DE 102 51 584 A1 shows an implementation in which an object-free protective zone is recorded by way of a camera, which comprises an arithmetic unit, and this image is used as a reference background. This reference background is checked with respect to the non-homogeneity thereof, which must not drop below a certain degree to be classified as valid. This procedure also allows homogeneous, in particular single-colored objects to be reliably detected as safety-critical objects within the protective zone during operation. The work equipment, such as a serial kinematic structure, for example, can be activated via a switching output of the camera arithmetic unit only when a "teach-in" operation has been carried out for a corresponding reference background, the object detection is approved, and no safety-critical object is recognized in the protective zone. For operation, however, this requires the monitoring system, in form of the camera and the arithmetic unit thereof, to be continuously activated. In addition, protective devices of this embodiment are generally used exclusively for work space monitoring and the associated collision monitoring.

DE 10 2008 021 671 A1 shows a method for monitoring a manipulator, wherein in addition to the position, further time derivatives of the position, such as speeds and accelerations, can be monitored. In principle, a method is described in which, during shutdown of the manipulator as a result of a failure to meet a safety function, a distinction is made between the reasons for the safety violation. This differentiation results in various scenarios for shutting down the manipulator, whereby braking that is faster and/or closer to the path is made possible, for example, and complex "re-positioning" is eliminated or at least the needed complexity is reduced. The term position refers to the positions of the joints of the manipulator, and in this connection, to the locations and/or orientations of the individual members of the manipulator. Based on this position, speeds and accelerations are calculated in the control unit of the manipulator, which can be monitored appropriately. Since the work space monitoring, which is to say the monitoring or a work or protective area of the manipulator, is carried out by detection devices using, for example, infrared light, electromagnetic radiation, radar radiation and the like, on the one hand, and by the potential monitoring of access doors, for example, on the other hand, a number of additional devices are needed, which increase the procurement costs and the upkeep or maintenance expenses. A further disadvantage of the described design is that the safety function monitoring system shuts down the manipulator in any case when one or more limit values are not met.

It is therefore the object of the present invention to implement a safety monitoring system of the type mentioned above in such a way that not necessarily all state variables that can be monitored are indeed permanently monitored and that a failure to adhere to one or more limit values does not automatically result in a shutdown of the serial kinematic structure. Moreover, as universal as possible as use for different serial kinematics should be achievable, at low preparation complexity and nonetheless broad monitoring options, and the need for monitoring sensors such as camera systems, laser scanners, ultrasonic sensors and the like should be minimized.

This object is achieved according to the present invention by a method and a safety monitoring system, wherein the current axis position of the joint of the serial kinematic structure is detected in the safety monitoring system independently of the control unit, and based thereon a current state variable of the joint is calculated in the safety monitoring device, which is compared to the limit value of the same by activation of the function module independently of the control unit, and the result of the comparison is output by the safety monitoring system.

This makes it possible to decide freely, independently of the control unit of the serial kinematic structure, which state variables are monitored and when, and what result the failure to adhere to one or more limit values leads to. An intervention in the control unit of the serial kinematic structure and/or the output of a visual and/or acoustic signal, as well as the activation of a safety function that may potentially already be present in the joint motor, would be conceivable, but is not mandatory. In this way, the safety monitoring device can be operated concurrently with and independently of the control unit of the serial kinematic structure. This independence of the control unit of the serial kinematic structure allows the safety monitoring to be adapted quickly and easily to a wide variety of tasks and kinematics with low preparation complexity.

In addition to calculating the rotation matrix of a joint, a calculation module calculates the absolute position of the joint from the position feedback of the joint motor, which is detected independently of the control unit of the serial kinematic structure. This means that the position feedback of a joint motor is used as the current axis position.

Since any serial kinematic structure is usually equipped with joint motors having corresponding position feedback, the safety monitoring system can directly access the position feedback of the joint motors in this advantageous embodiment and calculate the absolute position independently of the control unit of the serial kinematic structure. This results in the advantage that no additional sensors are needed for operating the safety monitoring system.

The parameterization is preferably carried out for joints comprising the serial kinematics and for the rigid connections of the same, which in sum form a serial kinematic structure to which the safety monitoring is to be applied, wherein the tool dimensions are also taken into consideration. A tool, having a tool center point, which is guided by the serial kinematic structure is treated like a joint by the safety monitoring system, and can thus also be monitored. In the description hereafter, the tool and the tool center point are nonetheless referred to as such to be able to illustrate the relationships more comprehensibly. For the parameterization, the geometry of the serial kinematic structure is advantageously defined by tables that are created outside the safety monitoring system and transmitted to the safety monitoring system. This allows safety monitoring to be adapted quickly to different embodiments of the serial kinematic structure.

Since it is possible to monitor multiple state variables of a joint by using function modules, wherein each state variable is assigned a function module and the function modules are activated or deactivated independently of one another, for example via an activatable/deactivatable input, it is possible for the user, a higher-level control unit or the like, for example, to determine which state variables are to be monitored as needed. Each function module has a dedicated activation input for activation and deactivation of the function modules, and this input can be used as needed. So as to monitor a state variable, the corresponding function module can be activated via an activation input.

In this way, the monitoring of various state variables can be arbitrarily activated or deactivated for a joint with respect to freely selectable limit values, even during the sequence of motion, independently of one another and independently of the control unit of the serial kinematic structure, for example by the user, a higher-level control unit or the like. This greatly increases the adaptability of the safety monitoring system to varying monitoring needs.

A further advantageous embodiment of the invention provides that multiple subregions are defined for the work environment of the serial kinematics for monitoring state variables. These subdivide the work environment that is within reach of the joints, the rigid connections thereof and the tool, and can differ depending on the application, task, and tool used. The advantage is that it is possible, for example, to define, quickly and with low complexity, regions in which the serial kinematic structure is not allowed to move, for different tasks that are carried out by the serial kinematic structure.

Another embodiment according to the invention provides that limit values for the state variables to be monitored can be adapted as a function of the subregions using defined logic modules. For example, a freely definable logic module can adapt the permissible limit speed and the safety limit angle as a function of the subregion in which the joint is located.

The advantage is that a lower limit speed can be selected when a joint or the tool is located in a subregion closer to the workpiece, for example, than in a less "collision-critical" subregion, wherein the respective limit speed applies to each joint and auxiliary coordinate system of the serial kinematic system at this point, which is to say when the joint or the tool enters the particular subregion.

Moreover, a selection can be made between different limit values for the state variable to be monitored upon activation of a function module using a request input. This allows a state variable to be limited as needed to different limit values. Depending on the activated function module and selected limit value, a certain limit speed, which then applies to every joint and thus also to the tool of the serial kinematic structure, a certain absolute position or location of any joint in the work environment of the serial kinematic structure, and an orientation of the tool, can be limited to a predefined "safe" value or to a "safe" region. This "safe" value/region can be selected freely; however, it can preferably only be modified when the function module is deactivated.

One advantageous embodiment of the invention provides for multiple joints of the serial kinematic structure to be monitored simultaneously. This allows targeted safety monitoring of individual joints, or also of the entire serial kinematic structure and an associated tool.

The present invention will be described hereafter with reference to FIGS. 1 to 10, which show an advantageous embodiment of the invention by way of example and in a schematic and non-limiting manner. In the drawings.

Figure 1:
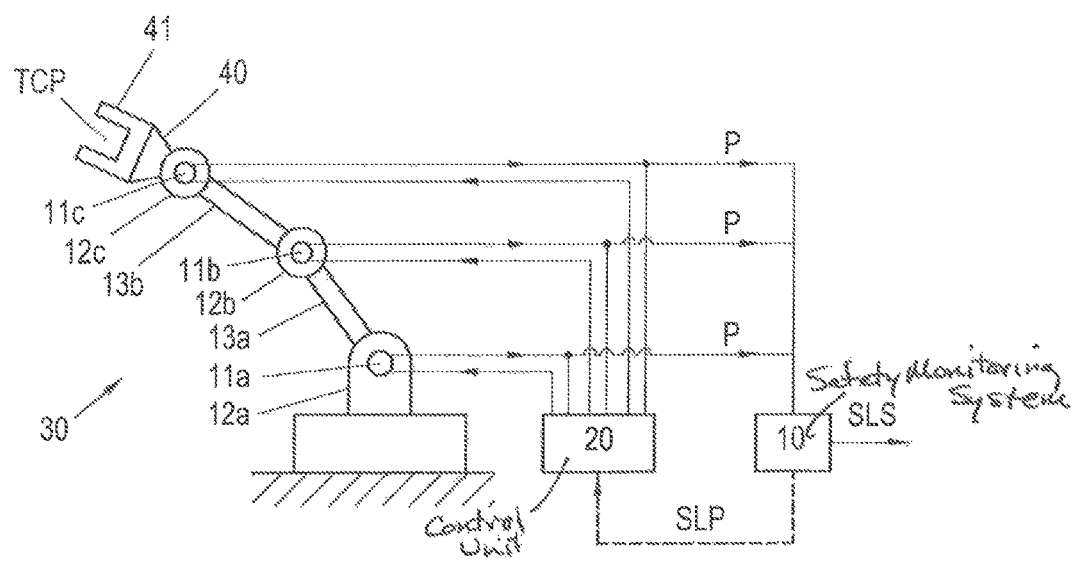
FIG. 1 shows a serial kinematic structure.

FIG. 1 shows the schematic design of a serial kinematic structure 30, which comprises joints 12*a* to 12*c* or more, and the joint motors 11*a* to 11*c* thereof, or corresponding to the joints 12 also more, rigid connections 13*a*, 13*b* between the joints 12, a tool holder flange 40, a tool 41, and an associated control unit 20. The integrated safety monitoring system 10 for monitoring the state variables is also schematically shown. The state variables of the serial kinematic structure 30 to be monitored can be, for example, the speed (Safely Limited Speed, SLS), the absolute position (Safely Limited Position, SLP) and the tool orientation (Safely Limited Orientation, SLO).

SLS and SLP are represented as a status that is output by the safety monitoring system 10, for example. It is left open according to the invention how a status output by the safety monitoring system is further processed. For example, a status may be transmitted to the control unit 20 of the serial kinematic structure 30, which operates independently of the safety monitoring function (illustrated in dash-dotted fashion for SLP), for example so as to bring the serial kinematic structure 30 to a halt. The status could alternatively also be used to trigger a visual and/or an acoustic signal, or to directly activate a potential integrated safety function of the joint motor 11, wherein a number of other options would also be conceivable.

The tool holder flange 40 and the tool center point (Tool Center Point, TCP) of the tool 41 are treated like a joint 12 by the safety monitoring system 10. As a result, the safety monitoring system 10 may include both the tool 41 itself and the tool center point TCP.

Figure 3:
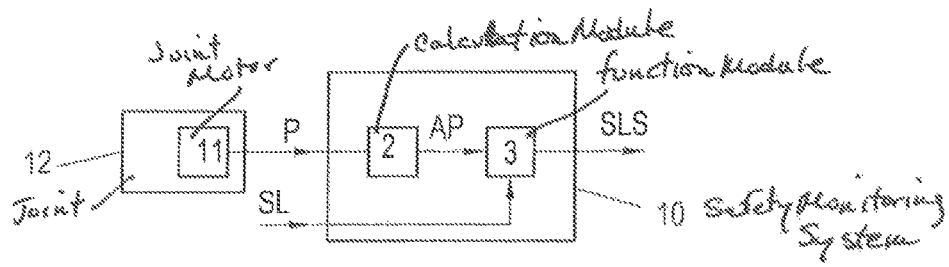
FIG. 3 shows a schematic of the safety monitoring system for a joint of a serial kinematic structure.

FIG. 3 shows the safety monitoring system 10 comprising a calculation module 2 and a function module 3, wherein the calculation module 2 could also be integrated in the function module 3. Proceeding from a reference position of the joints 12, in which the torsion angle (revolute joint) and/or the linear positions (prismatic joint) of the joint axis are set to zero, the current axis position P represents the relative position (torsion, displacement) of the joint axis with respect to the reference position thereof, and shall therefore be regarded as a relative value. The current axis position P is determined from the position feedback of the joint motor 11 associated with the joint 12, for example, and is read into the calculation module 2, wherein other options of position determination are also conceivable, of course. The current axis position P of the joint motor 11 is detected independently of the control unit 20 of the serial kinematic structure 30.

Based on the current axial position P, the calculation module 2 calculates the absolute position AP of the joint 12 to be monitored with the aid of mathematical methods known per se, for example using the forward kinematics transformation, and the position is transmitted to the function module 3. Based on the transmitted absolute position AP of the joint 12, the function component 3 calculates the speed of the joint, for example, as the state variable and compares the same to a limit speed SL predefined by the user, a higher-level control unit or the like, for example.

The output supplied by the function module 3 is the result of the comparison in the form of a status SLS. For example, this status SLS is a Boolean output, which outputs an instance where a limit value is exceeded in the form of SAFEFALSE "0", for example, or in the form of SAFETRUE "1" when the value is not exceeded. As was already mentioned for FIG. 1, it is left open according to the invention how the status SLS is processed further.

Figure 4:
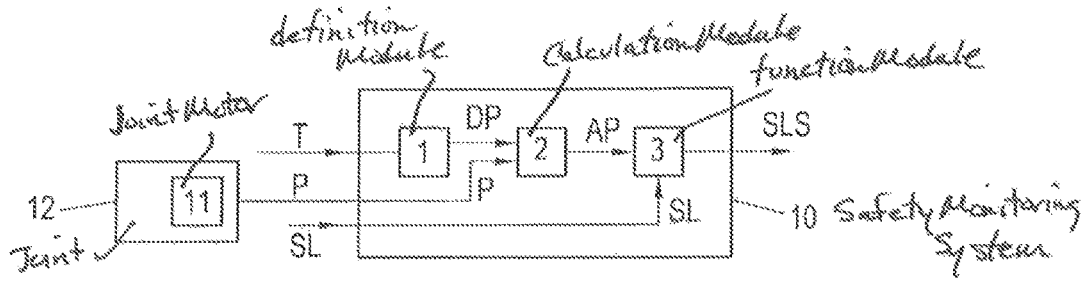
FIG. 4 shows a schematic according to the invention of the safety monitoring system in one advantageous embodiment.

FIG. 4 shows one embodiment of the safety monitoring system 10 comprising a definition module, 1 a calculation module 2 and a function module 3. As was also described in FIG. 3, the illustrated modules can also be integrated into each other.

The definition module 1 is used for the one-time definition of the serial kinematic structure 30, for example in the form of a tabular system T. This tabular system T contains the definitions of the joints 12 and of the possible joint properties thereof (revolute or prismatic joint), the mechanical joint couplings, the coordinate systems, the geometric dimension of the rigid connections 13, which is to say the distances from one joint 12 to the next, the definition of auxiliary coordinate systems, the tool dimensions, and the associated tool center points TCPs, in freely selectable units of measurement. By parameterizing an aforementioned auxiliary coordinate system, additional displacement and/or torsion in the space, independently of a joint 12, can be defined. For example, mounting of a serial kinematic structure 30 on a lifting platform is conceivable. If an auxiliary coordinate system is parameterized for the serial kinematic structure 30, the movement of the same, which is to say the movement of the entire serial kinematic structure 30, on the lifting platform can be monitored, like the movement of a joint 12.

It is also possible to define multiple tool center points TCPs in the tabular system T. A switch can be made from one tool 41 to another without having to deactivate the monitoring system by using a potential, parallel monitoring system.

By way of the tabular system T, the definition module 1 creates a data packet DP, which describes the full scope of the serial kinematic system 30 for the safety monitoring system 10. This data packet DP is relayed to the calculation module 2. If needed, the definition module 1 converts all values captured in the tabular system T into one uniform unit of measurement, for example millimeter and radian. Moreover, the entered values can be checked for plausibility, which is to say, for example, for whether a serial kinematic structure 30 defined in the tabular system T is physically possible to begin with. If this is not the case, the calculated data packet DP is identified as invalid and can thus not be processed further. The occurrence of such errors can also result in arbitrary scenarios. For example, intervening in the control unit 20, which establishes the safe reference position of the serial kinematic structure 30, or a visual, acoustic or similar output would be conceivable.

As was already described in FIG. 3, the current axis position P, which results from the position feedback of the joint motor 11, for example, is read into the calculation module 2, and the absolute position AP of the joint 12 is calculated and transmitted to the function module 3. From the transmitted absolute position AP of the joint 12, as is also shown by way of example in FIG. 3, the function module 3 calculates the speed of the joint as the state variable and compares the same to a selected limit speed SL, wherein the result of the comparison is again output in the form of a freely usable status, which in this case is SLS.

Figure 5:
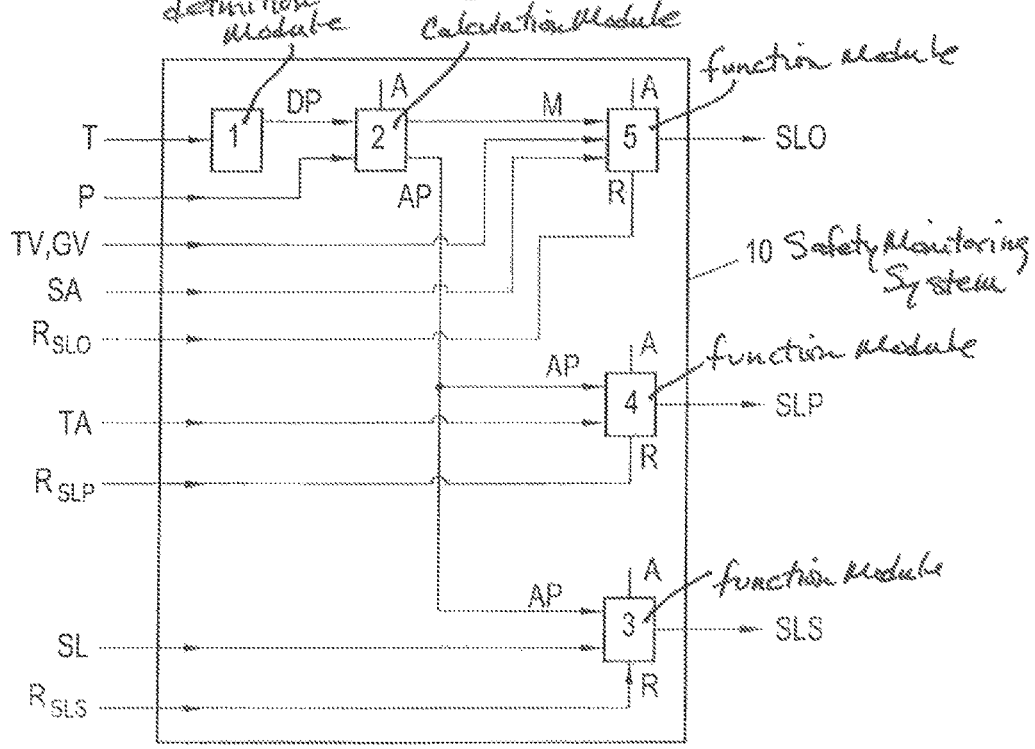
FIG. 5 shows a schematic according to the invention of the safety monitoring system in a particularly advantageous scope.

FIG. 5 is a schematic representation of a possible variant embodiment of the safety monitoring device 10 in a particularly advantageous scope comprising the definition module 1, the calculation module 2, and multiple function modules 3 to 5. The individual function modules 3 to 5 monitor different state variables of the serial kinematic structure 30. The function modules 3 to 5 used represent the safety monitoring system 10, which is autonomous of the control unit 20 of the serial kinematic structure 30, optionally in combination with the definition module 1 and the calculation module 2. Using the tabular system T, the definition module 1 creates a data packet DP and relays the same to the calculation module 2.

The data packet DP is used by the calculation module 2 to calculate the rotation matrices M and, using the known forward kinematics transformation, the absolute positions AP of the joint 12 defined in the tabular system T and of the tool 41 to be monitored. The rotation matrix M indicates the orientation/torsion of the axis of a joint-based/joint-fixed coordinate system relative to a work environment-based, absolute coordinate system that is valid for the entire serial kinematic structure 30, such as the global space coordinate system. Using the rotation matrix M, the calculation module 2 calculates the absolute positions AP of the joint 12 and of the tool 41 to be monitored from the relative position P.

The calculated absolute position AP is transmitted to the function module 3, which, as described above, calculates the speed of the joint 12 to be monitored, or similarly of the tool 41, and compares it to a selected limit speed SL.

The function module 3 can provide different limit speeds SL to select from, for example via multiple inputs. The selection of the corresponding limit speed SL can be made using multiple request inputs $R_{SLS}$. The output supplied by the function module 3 is a status SLS.

Figure 2:
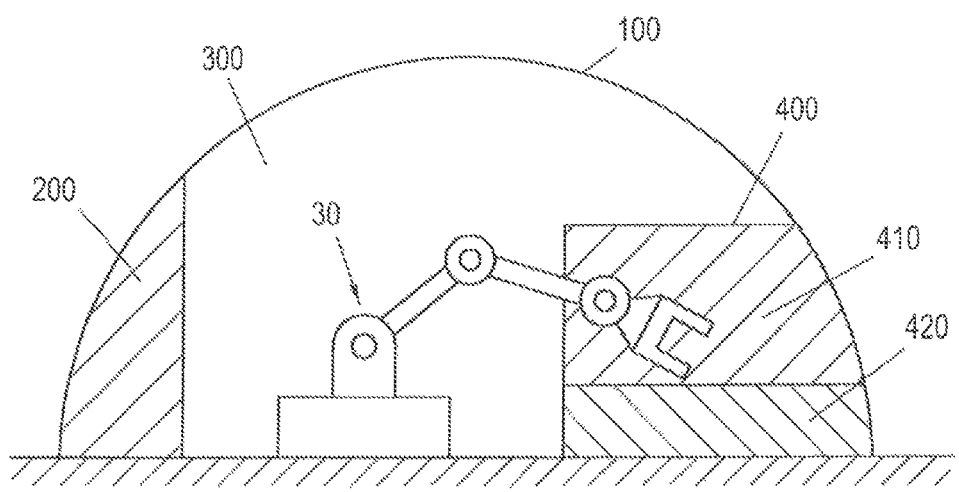
FIG. 2 shows the work environment of the serial kinematic structure, together with the subregions thereof.

FIG. 2 shows the work environment 100 of the serial kinematic structure 30, together with the subregions thereof. For this purpose, for example, a protective region 200, a movement region 300 and a work region 400 for monitoring the joints 12, or the state variables thereof, for example in the form of a table TA, may be defined as subregions, such as by the user, a higher-level control unit or the like, wherein the following may apply:

protective region 200: a region which no joint 12, no rigid connection 13 of two joints 12, or the tool 41 must enter.

movement region 300: a region which no joint 12, no rigid connection 13 of two joints 12, or the tool 41 must leave.

work region 400: a region in which a tool 41 treated like a joint 12 by the safety monitoring system 10 acts, for example severing, joining, manipulating or the like.

Moreover, the work region 400 may be subdivided into multiple partial work regions 410, 420, which in turn can be arbitrarily defined, for example in the table TA, or can be adapted to the existing serial kinematic structure 30. Similarly, the movement region 300 can also be subdivided into multiple partial movement regions.

For example, for the different partial work regions 410, 420, the user, a higher-level control unit or the like can define different limit values for the state variables to be monitored, which can be selected via the request inputs R of the function modules 3, 4, 5.

The absolute positions AP of the joint 12 to be monitored and/or of the tool 41 which are output by the calculation module 2 are also transmitted to the function module 4. Based on the absolute positions AP of the joint 12 and/or of the tool 41, the function module 4 determines in what region of the work environment 100 the joint 12 and/or the tool 41 are located.

For the absolute position of the serial kinematic structure, the regions 200, 300, 400 defined by way of example and the subregions 410 and 420 represent corresponding limit values. In the function module 4, the current absolute positions AP of the joint 12 and/or of the tool 41 are compared to the regions 200, 300, 400 and the subregions 410 and 420 defined in the table TA. When activated, the function module 4 supplies the status SLP, which can be used freely, as is true for status SLS. For example, if the joint 12 is located within the above-described protective region 200, during the safety violation this status SLP is set to a value identifying the violation. The same takes place when the joint 12 and/or the tool 41 are located neither within the movement region 300 or the possible partial movement regions, nor within the work region 400 or a partial work region 410, 420.

Figure 6:
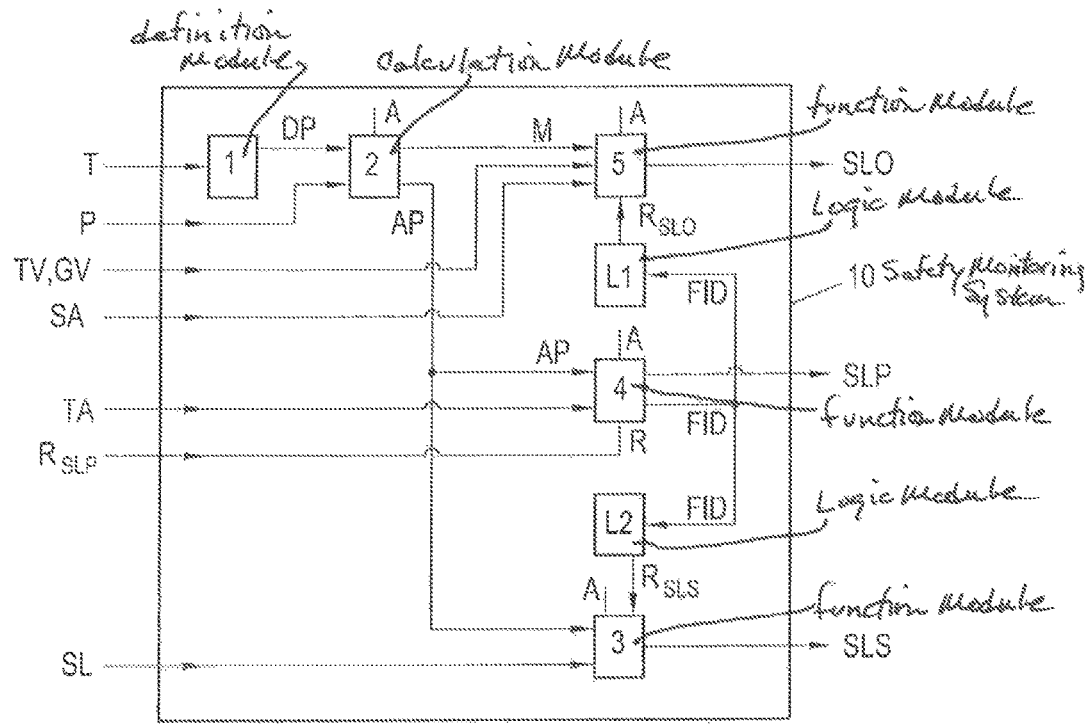
FIG. 6 shows a further schematic according to the invention of the safety monitoring system in a particularly advantageous scope which also comprises freely defined logic modules.

Each partial work region 410, 420 is identified by a dedicated function ID FID. If the tool 41 is located in a partial work region 410, 420, for example, the function ID FID of this partial work region 410, 420 can also be output by the function module 4, for example. In one advantageous embodiment of the invention, as shown in FIG. 6, the function ID FID can be used to select limit values for the state variables to be monitored with the aid of logic modules, such as L1 and L2. For example, the limit speed SL, which represents an input for the function module 3, and the safety limit angle SA, which represents an input for function module 5, can be selected as a function of the partial work region 410, 420 in which the joint 12 is located via the request inputs $R_{SLS}$ and $R_{SLO}$.

A safety limit angle SA represents the maximum permissible angle 50 between the global direction vector GV and the tool direction vector TV in the form of a circular cone around the global direction vector GV. The global direction vector GV is arbitrarily defined, for example normal to a workpiece surface to be machined. The tool direction vector TV can denote the orientation of the tool 41, which is to say the direction of outcoupled laser radiation 60, for example; however, other definitions for the tool direction vector TV, for example perpendicularly to a machining head of a laser, are also possible.

Figure 7:
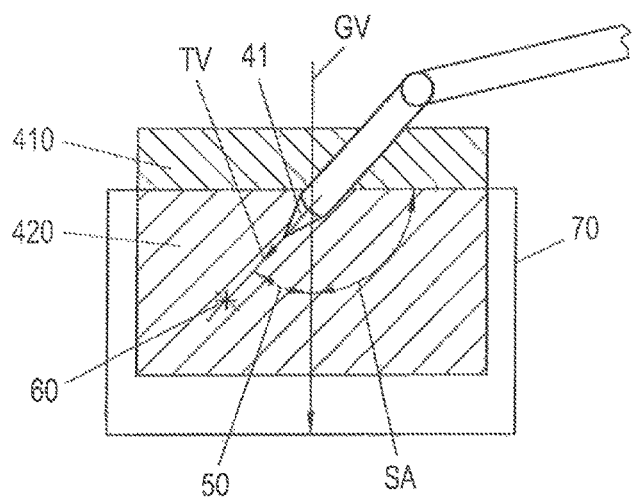
FIG. 7 shows the relationship between safety limit angle, tool direction vector, and the global direction vector of the tool holder.

The function module 5 is used to monitor the tool orientation, which gains in importance in particular when beam tools, such as lasers, are used. The function module 5 compares a safety limit angle SA, which according to the invention can be partial work region-dependent, to the angle 50 between the current tool direction vector TV and the global direction vector GV. The relationship between the safety limit angle SA, tool direction vector TV, and the global direction vector is illustrated in FIG. 7. For example, an aforementioned logic module L1 may mean that, as long as the tool 41 is located in the partial work region 410, the angle 50 between the global direction vector GV and the tool direction vector TV is limited to a safety limit angle SA of 1°, for example. As soon as the tool 41 enters the partial work region 420, the safety angle SA is increased to 90°, for example, as is shown in FIG. 7. In conjunction with the illustrated global direction vector GV and the tool direction vector TV, a focused laser beam 60 is thus effectively prevented from leaving a potential, physical protective border, for example.

Figure 8:
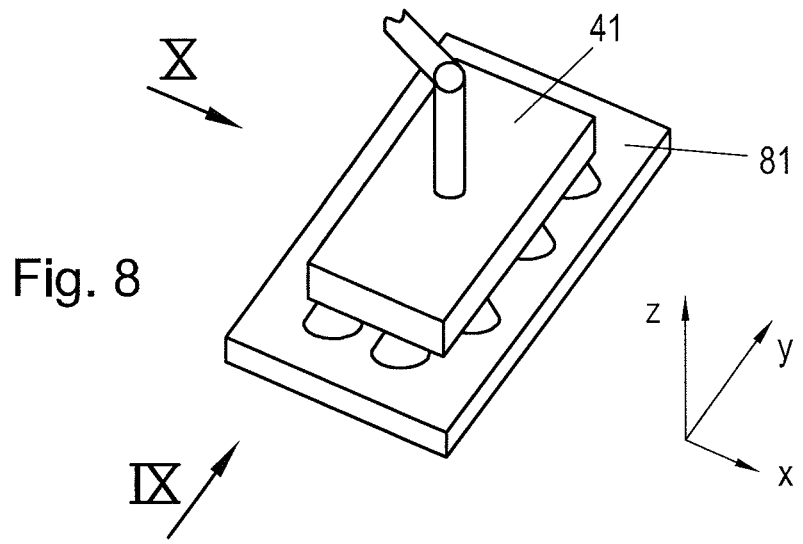
FIG. 8 shows a perspective view of a pick-up tool.
Figure 9:
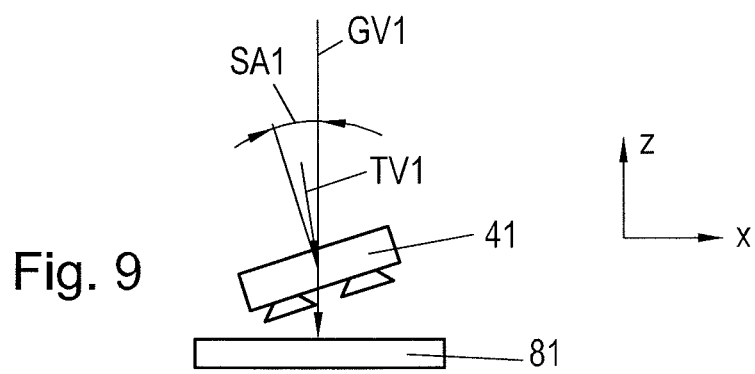
FIG. 9 shows the view of the pick-up tool illustrated in FIG. 8 from direction IX.
Figure 10:
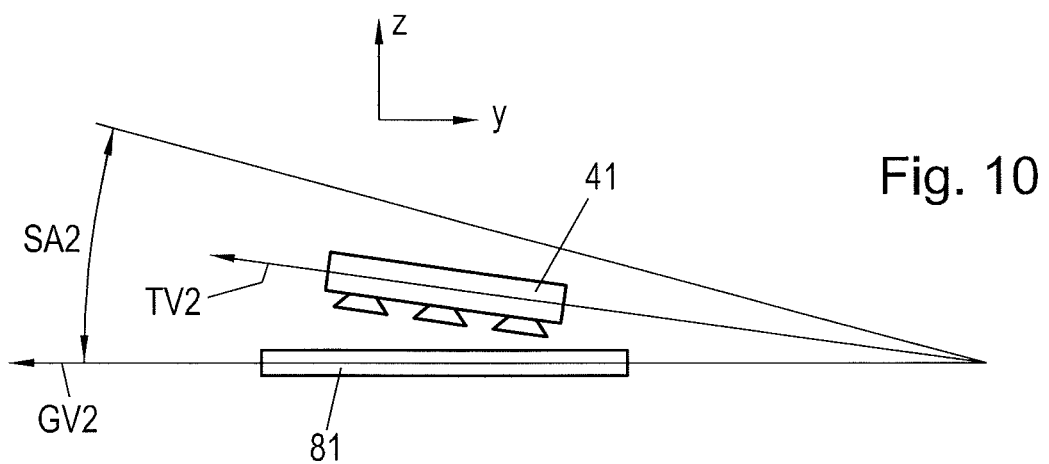
FIG. 10 shows the view of the pick-up tool illustrated in FIG. 8 from direction X.

Depending on the application and tool 41 used, it is conceivable that multiple safety angles SA must be monitored. Such a case is illustrated in FIG. 8, FIG. 9, and FIG. 10. FIG. 8, for example, shows a perspective view of picking up or placing down a workpiece 81 using a rectangular pick-up tool as the tool 41. GV1 represents the global direction vector, and TV1 represents the tool direction vector. The safety limit angle SA1 represents the maximum permissible angle between the global direction vector GV1 and the tool direction vector TV1.

When a single safety limit angle SA1 (see FIG. 9), which is sufficient for the smaller dimension of the pick-up tool 41, is defined so as to effectively prevent a collision in the vicinity of the workpiece 81, a collision with the workpiece 81 may already take place if tilting by the same angle occurs in the direction of the larger dimension of the pick-up tool 41. For this reason, a second global direction vector GV2 and a matching second tool direction vector TV2 are defined (see FIG. 10). These two vector pairs can be assigned a respective safety limit angle SA1 and SA2, whereby it is ensured that tilting of the tool 41 about the respective axis is limited to the region that ensures collision-free pick-up of the workpiece 81. Two function modules 5, optionally comprising two associated logic modules L1, can be used to monitor the two safety limit angles SA1 and SA2.

If multiple tools 41 are used, a dedicated function module 5 may be assigned to each tool. So as to determine the current angle 50 between the tool direction vector TV and the global direction vector GV, the tool direction vector TV is related to the global coordinate system with the aid of the rotation matrices M. The rotation matrices M thus represent a further input variable for the function module 5, in addition to the tool direction vector TV, the global direction vector GV and the safety limit angle SA. By supplying the status SLO, the function module 5 provides an output variable, which can again be used freely.

With the exception of the definition module 1, which includes only the tabular system T for defining the serial kinematic structure 30, all modules have an activation input A. This input can be assigned, for example by the user, a higher-level control unit of the like, to activate the module for use. If the input is set to TRUE "1," the module, and thus monitoring of the corresponding state variable, is activated, wherein a freely selectable limit value can no longer be varied as long as the corresponding function module 3, 4, 5 is activated. The temporary deactivation of the calculation module 2 or of one of the function module 3 to 5, if these are not needed for safety monitoring, allows arithmetic capacity to be saved and thus used elsewhere. It should be considered a matter of course that the calculation module 2 cannot be deactivated independently of the function modules 3, 4, 5.

The described safety monitoring system 10 can, of course, also be used to monitor multiple joints 12 and/or tools 41, wherein the function modules 3, 4, 5 fulfill the same function as when monitoring a single joint 12 and/or tool 41.

The invention claimed is:

1. A method for monitoring the safety of a joint of a serial kinematic structure, the method comprising:
   carrying out tasks with the joint of the serial kinematic structure under control of a control unit;
   detecting, independently of the control unit, a current axis position of the joint of the serial kinematic structure;
   monitoring, with a function module, state variables, wherein a current state variable of the joint is determined cyclically from the current axis position of the joint;
   comparing the current state variable to a configurable limit value; and
   outputting a result of the comparing as a status,
   wherein when the status is that the current state variable exceeds the configurable limit value, the status is at least one of transmitted to the control unit to halt the kinematic structure or transmitted to trigger a visual and/or acoustic signal or to directly activate a safety function, and
   wherein the function module is activated or deactivated independently of the control unit during a sequence of motions of the serial kinematic structure.

2. The method according to claim 1, wherein a position feedback of a joint motor is used as the current axis position.

3. The method according to claim 1, wherein the current axis position of the joint of the serial kinematic structure is detected in a safety monitoring system and a geometry of the serial kinematic structure is defined by tables created outside the safety monitoring system and transmitted to the safety monitoring system.

4. The method according to claim 1, wherein multiple state variables of a joint are monitored by function modules, such that each state variable is assigned a function module and the function modules are activated or deactivated independently of one another.

5. The method according to claim 1, wherein multiple subregions are defined for a work environment of the serial kinematic structure for monitoring state variables.

6. The method according to claim 5, wherein the limit values for the state variables are adapted as a function of the subregions using defined logic modules.

7. The method according to claim 1, further comprising selecting the limit value from a plurality of different limit values upon activation of a function module using a request input.

8. The method according to claim 1, wherein multiple joints of the serial kinematic structure are monitored simultaneously.

9. A safety monitoring system for a joint of a serial kinematic structure, the safety monitoring system comprising:
   a control unit configured to control the joint of the serial kinematic structure to carry out tasks;
   an input receiving, independently of the control unit, a current axis position of the joint of the serial kinematic structure;
   a calculation module, which is connected to the input and which is configured to calculate a current state variable of the joint from the current axis position; and
   a function module, which has a limit value input and which is independent of the control unit, being configured to compare the current state variable to a limit value received via the limit value input and to output the result of the comparison as a status to an output of the safety monitoring system,
   wherein when the status is the current state variable exceeds the limit value, the status is at least one of transmitted to the control unit to halt the kinematic structure or transmitted to trigger a visual and/or acoustic signal or to directly activate a safety function, and
   wherein the function module comprises an activation input, which is usable to activate or deactivate the function module independently of the control unit during a sequence of motions of the serial kinematic structure.

10. The safety monitoring system according to claim 9, wherein the joint of the serial kinematic structure comprises a joint motor, which outputs the current axis position as position feedback to an output, and the output is connected to the input of the safety monitoring system for transmitting the current axis position to the safety monitoring system.

11. The safety monitoring system according to claim 9, further comprising an input for transmitting a table, which includes the geometry of the serial kinematic structure, and a definition module, which is connected to the safety monitoring system input and to which the table is transmitted.

12. The safety monitoring system according to claim 9, further comprising multiple function modules for monitoring multiple state variables, wherein the multiple function modules are activatable and deactivatable independently of one another and independently of the control unit via respective activation inputs.

13. The safety monitoring system according to claim 9, wherein the function module comprises a request input, via which different limit values for the state variables to be monitored are selectable.

14. The safety monitoring system according to claim 9, wherein a work environment of the serial kinematic structure is subdivided into subregions, and the function module comprises at least a first and second function module, and
    the safety monitoring system further comprises a logic module, wherein the logic module comprises an input that is connected to an output of the first function module, via which a subregion in which the joint is presently located is communicated to the logic module, and an output that is connected to a request input of the second function module, via which the limit value for the state variable in the second function module is selectable as a function of the subregion.

15. The method according to claim 1, wherein the current state variable of the joint comprises an absolute position or time derivatives thereof.

16. The safety monitoring system according to claim 9, wherein a geometry of the serial kinematic structure is defined by tables created outside the safety monitoring system and transmitted to the safety monitoring system.

\* \* \* \* \*